United States Patent [19]

Fisher et al.

[11] Patent Number: 4,735,542
[45] Date of Patent: Apr. 5, 1988

[54] TRUCK RESTRAINT

[75] Inventors: Patrick W. Fisher, Milwaukee; James P. Hagen, Hartland, both of Wis.

[73] Assignee: Nova Technology, Inc., Hartford, Wis.

[21] Appl. No.: 860,644

[22] Filed: May 7, 1986

[51] Int. Cl.$^4$ ............................................ B65G 67/02
[52] U.S. Cl. ...................................... 414/401; 404/6
[58] Field of Search ................. 414/401, 396, 584; 14/71.1, 71.3; 404/6; 392/DIG. 15

[56] References Cited

U.S. PATENT DOCUMENTS

| | | | |
|---|---|---|---|
| 2,489,869 | 11/1949 | Dunn | 414/401 |
| 2,565,072 | 8/1951 | French | 414/584 |
| 4,282,621 | 8/1981 | Anthony et al. | 14/71.1 |
| 4,342,525 | 8/1982 | Mastronuzzi, Jr. | 404/6 |
| 4,443,150 | 4/1984 | Hahn et al. | 414/401 |
| 4,488,325 | 12/1984 | Bennett et al. | 414/401 X |
| 4,576,508 | 3/1986 | Dickinson | 404/6 |
| 4,589,813 | 5/1986 | Hagen et al. | 414/401 |
| 4,601,502 | 7/1986 | Van Dyre | 292/DIG. 15 |
| 4,630,989 | 12/1986 | Davey | 414/401 |
| 4,634,334 | 1/1987 | Hahn et al. | 414/401 |

Primary Examiner—Peter A. Aschenbrenner
Attorney, Agent, or Firm—Ronald E. Barry

[57] ABSTRACT

A ground level truck restraint assembly, including a casing adapted to be buried in a driveway in front of a loading dock, a restraining member mounted in the casing for movement between a storage position in the casing to an operative position projecting upwardly from the casing into the path of motion of the ICC bar on a truck and a housing having a slide mounted on the dock a cable having one end connected to the restraining member and the other end connected to the slide in the housing for moving the restraining member to the operative position when a truck is located at the dock.

11 Claims, 5 Drawing Sheets

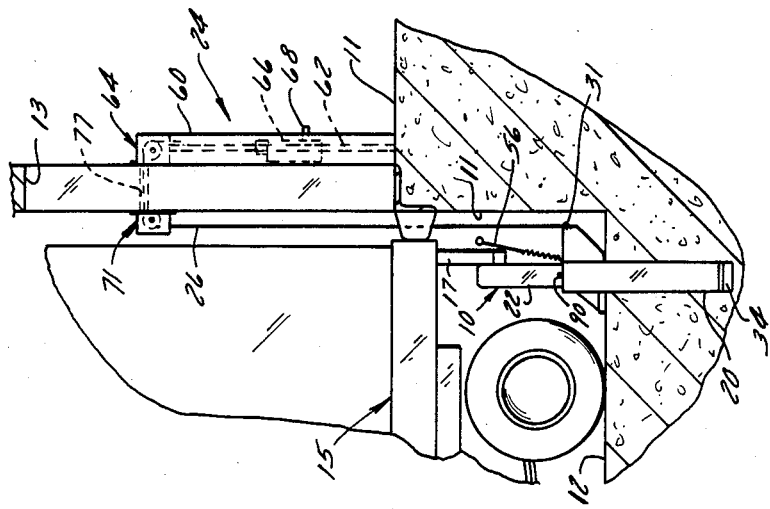
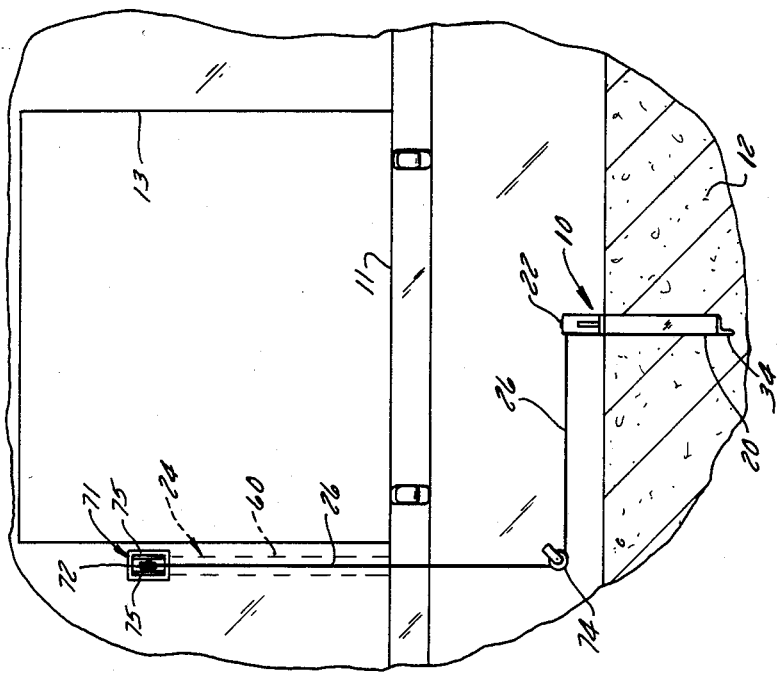

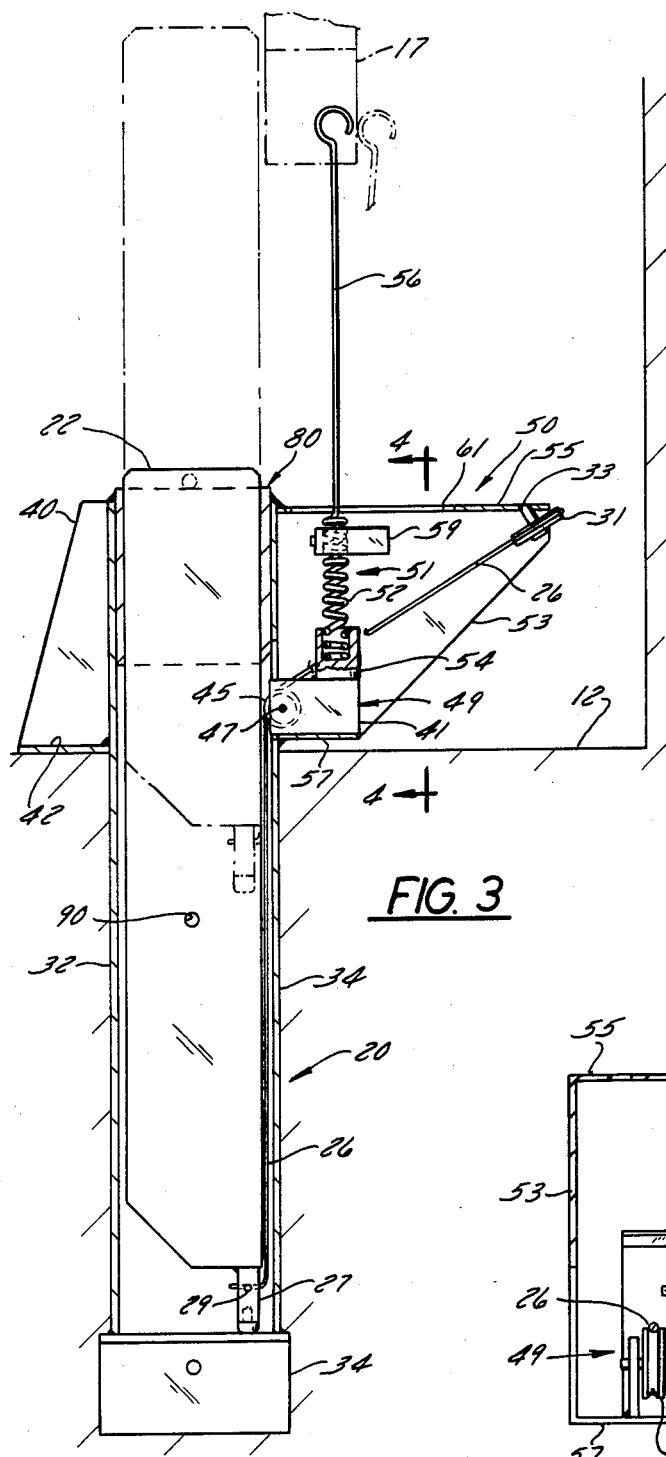
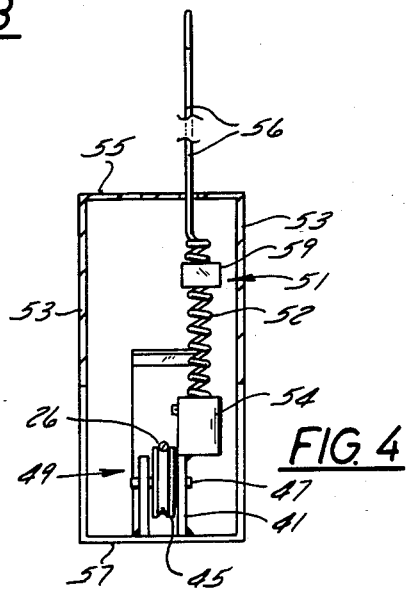
FIG. 3
FIG. 4

4,735,542

TRUCK RESTRAINT

BACKGROUND OF THE INVENTION

Truck restraining devices of the type contemplated herein are generally designed to engage the ICC bar on the rear of a truck trailer to prevent the trailer from moving away from the dock. These devices were developed because of accidents which occur if the truck trailer moved away from the dock leveler. If the trailer moves far enough away from the dock, forklifts, which are used to load and unload the trailers, have fallen between the dock and the truck. Even in instances where wheel chocks have been used to block the wheel to prevent movement of the trailer, sufficient force can be generated by the drive wheels of the forklift, if the forklift for some reason becomes jammed against the dock leveler, to push the truck trailer away from the dock. Truck restraints have therefore been used to lock the trailer to the dock. These are mounted on the front of the dock to engage the ICC bar and prevent the trailer from moving away from the dock during the loading and unloading operation. Restraints presently available are mounted directly on the front of the dock and thus present an obstruction in the driveway which requires the dock to be dedicated for use for a particular type of truck trailer only. The restraint also obstructs the area around the front of the dock, making it difficult to clean debris from the dock area.

SUMMARY OF THE INVENTION

The truck restraint assembly according to the present invention overcomes the above disadvantages by being located in the driveway with the top of the restraint being flush with or projecting upward from the driveway. This eliminates the necessity of anchoring the restraint assembly on the front of the dock and allows the restraint assembly to be moved from a position below the driveway to a blocking position after the truck trailer has been backed into the loading position in front of the dock. The dock leveler can be used for any size truck and does not have to be dedicated to a particular use because of the presence of the truck restraint on the front of the dock. Since the restraint assembly is positioned for movement into the path of motion of the ICC bar, it can be used effectively with any ICC bar configuration. The compact design of the restraint assembly makes it possible to mount the restraint assembly in the driveway with the operating system or mechanism hidden within the building.

THE DRAWINGS

FIG. 1 is a front view of a loading dock showing the truck restraint assembly in the storage position in front of the dock.

FIG. 2 is a side view of the loading dock showing the restraint assembly elevated to a blocking position in the front of the dock.

FIG. 3 is a side view of the restraint assembly.

FIG. 4 is a view taken on line 4—4 of FIG. 3.

DESCRIPTION OF THE INVENTION

Figure 5:
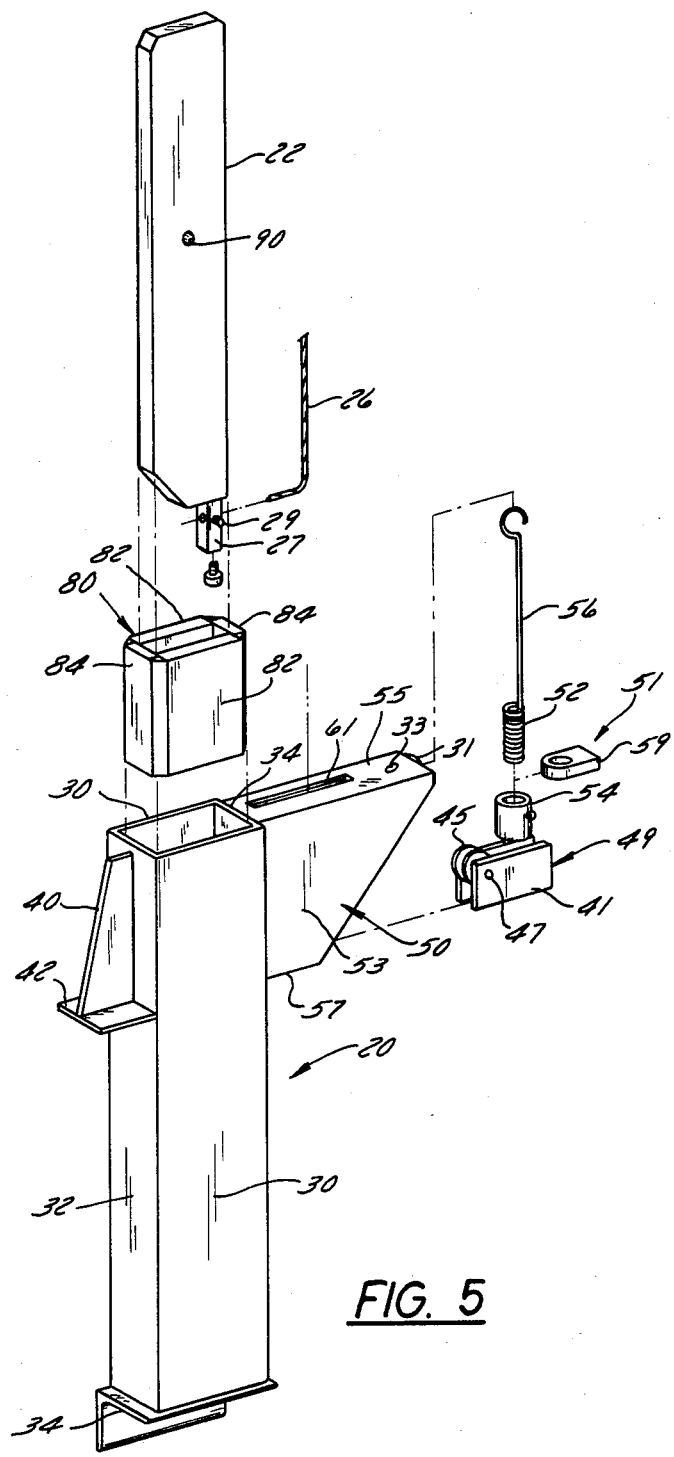
FIG. 5 is an exploded perspective view of the truck restraint assembly.

The truck restraint assembly 10 as seen in FIGS. 1 and 2 is shown embedded in a driveway 12 in a centered position with respect to the door opening 13 in the dock 11 and spaced therefrom. In FIG. 1, the restraint assembly is shown in the storage position. In FIG. 2, a truck 15 is shown positioned in front of the dock 11 with the restraint assembly in the operative position with respect to the ICC bar 17.

As seen in FIG. 3, the truck restraint assembly 10 generally includes a hollow, tubular pipe or casing 20 with a restraining member or bar 22 mounted for axial movement within casing 20. The restraint assembly is operatively connected to an actuating assembly 24 by means of a cable 26.

The hollow tubular pipe or casing 20 is formed by two side plates 30, a front plate 32 and a rear plate 34. The casing is closed at the bottom by means of a cap 34 in the form of an angle iron mounted on the bottom of the casing. Means are provided on the front of the casing to provide vertical and horizontal reinforcement at the upper exposed end of the casing. Such means is a form of a vertical plate 40 attached to the front plate and a horizontal plate 42 secured to the bottom of the vertical plate 40. As seen in FIGS. 2 and 3, when the tubular pipe 20 is embedded in the ground, the horizontal plate 42 will rest on the driveway providing a supporting surface to positively locate the top of the casing approximately eleven inches off the level of the driveway. If the pipe 20 is embedded in the ground with the top of the pipe flush with the driveway, the reinforcement means is not required.

The restraining member 22 is in the form of a flat plate which is mounted for axial movement in the casing 20. Means are provided in the top of the casing to guide the plate as it is moved up and down in the casing 20. Such means is in the form of a guide tube 80 positioned at the upper end of the casing 20. The tube 80 includes two side plates 82 and two end plates 84. The rectangular opening formed by the plates 82 and 84 should be approximately the same size as the plate 22.

An operating housing 50 is provided on the back plate 34 to house the truck signalling device 51 and cable guide assembly 49. The housing is formed by two side plates 53, a cover plate 55 and a bottom plate 57. The sensing device 51 comprises a spring 52 having a sensing rod 56 on one end with the other end mounted in a block 54 mounted on the guide assembly 49. A mercury switch 59 is mounted on the spring 52. The sensing rod 56 projects through a slot 61 in the top plate 55 in the path of motion of the ICC bar 17. When the ICC bar 17 on the truck engages the sensing rod 56, the mercury switch 59 will tilt closing the switch to provide an indication of the presence of a truck at the loading dock. The mercury switch 59 is connected to a light board (not shown) which is used to provide a visual indication both in the front of the dock and inside of the building that the truck is at the dock.

The guide assembly 49 includes a bracket 41 which is mounted on the bottom wall 57, a pulley 45 is mounted on a pin 47 in the bracket with the edge of the pulley located within the housing 20. A second pulley 31 is mounted on a pin 33 located at the upper end of the housing 50. The cable 26 is connected to a mounting block 27 by a screw 29 at the bottom of the restraining member 22 and is reaved around pulley 31 and pulley 45 for connection to the actuating assembly 24.

Figure 6:
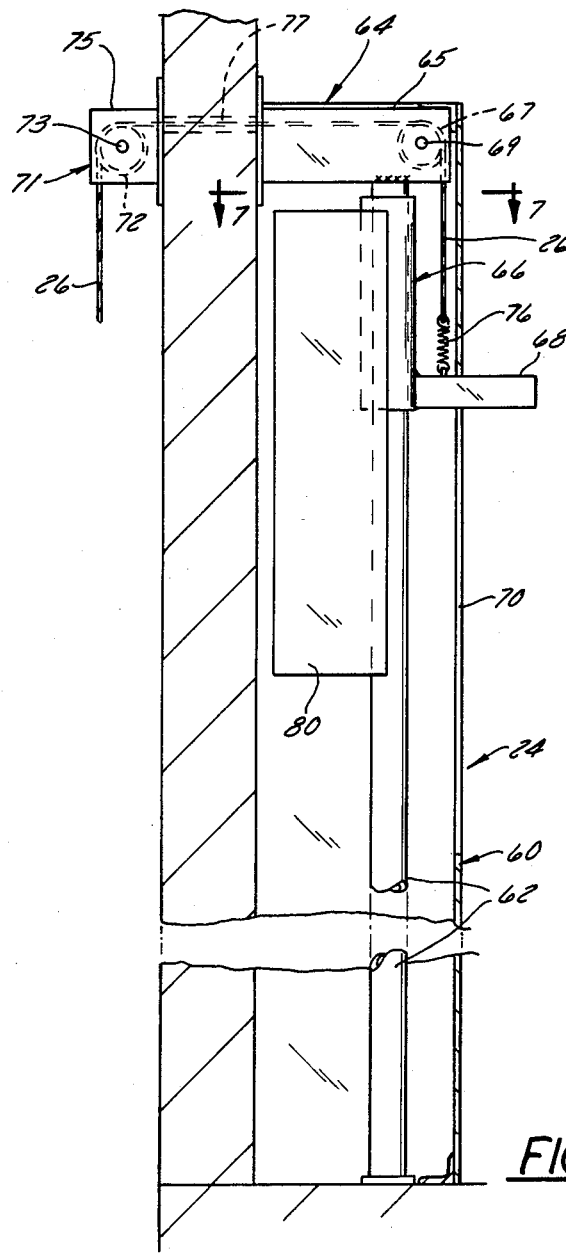
FIG. 6 is a side elevation view of the operating assembly for the truck restraint assembly.
Figure 7:
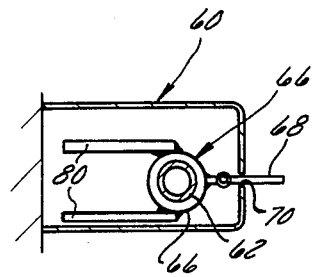
FIG. 7 is a view taken on line 7—7 of FIG. 6.
Figure 8:
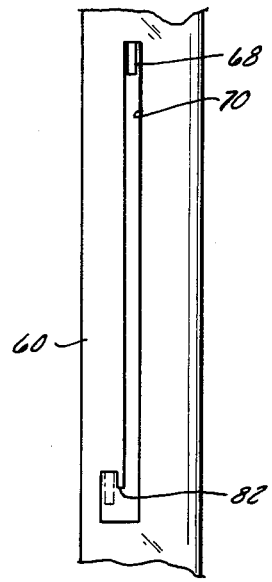
FIG. 8 is a front elevation view of the operating handle assembly.

The restraining member 22 is raised to the blocking position by means of the actuating assembly 24 which is mounted on the inside of the wall of the door opening 13 in the building. The assembly 24 includes a housing 60, a post 62 and a pulley support assembly 64 as seen in FIGS. 6, 7, and 8. A slide 66 is mounted on the post 62 for vertical movement in the housing 60. A handle 68 is mounted on the slide and extends outwardly through a slot 70 in the housing 60. The pulley assembly 64 is mounted on the top of the housing 60 and includes a pair of plates 65 having a pulley 67 mounted on a pin 69 between plates 65. A second pulley assembly 71 is mounted on the outside of the building with a pulley 72 mounted on a pin 73 between plates 75. The cable 26 is reaved around a pulley 74 mounted on the front of the dock and pulley 72 is assembly 71. The cable passes through a hole 77 in the wall and around pulley 67 with the end of the cable 26 connected to the slide 66. Means in the form of a spring 76 can be provided between the cable 26 and slide 66 to provide a bias force to the restraining member 22 in the event the member 22 engages an obstruction on the truck.

Means can be provided on the slide 66 for counterbalancing a portion of the weight of the restraining member 22. Such means is in the form of a plate 80 having a weight approximately equal to one-half the weight of the member 22. Means are provided in the housing 60 assembly for locking the restraint in the upper position. Such means is in the form of a catch 82 provided at the bottom of the slot 70 in the operating assembly housing. The handle 68 is moved downward in the housing until it clears the catch 82 and the handle is pivoted under the catch 82 in order to lock the handle and slide in the down position with the restraint member 82 in the upper position.

The restraint assembly can also be used to lock the trailer to the dock if it is left at the dock for any extended period of time. Such means is in the form of a hole 90 provided in the plate 22 at the top of the casing 20 when the plate is in the full up position. A pin can then be pushed through the hole 90 and padlocked to the casing preventing the restraint from movement into the casing if the cable is cut. Upward movement can also be prevented by padlocking the pin to the casing.

Figure 9:
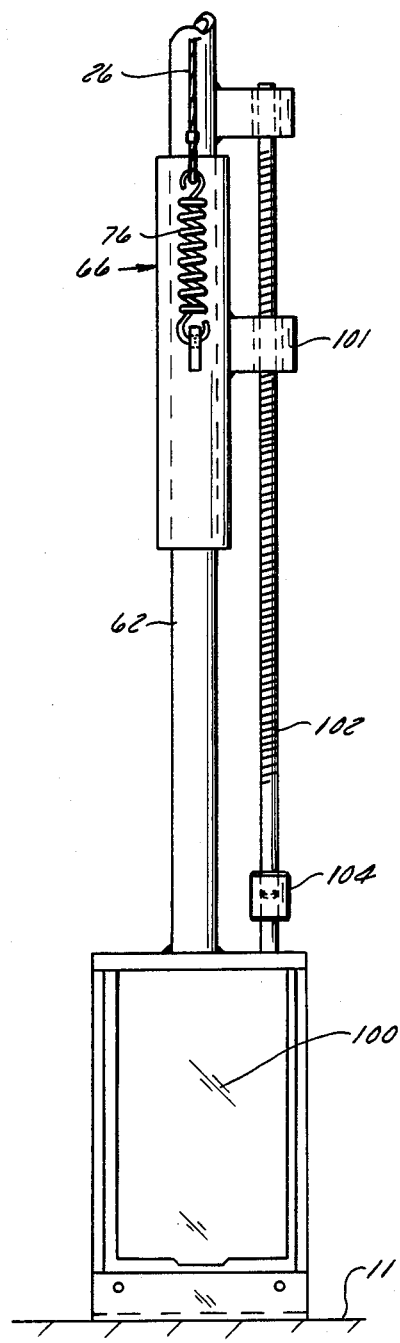
FIG. 9 is a schematic view of an alternate embodiment of the operating assembly.

A manual actuating assembly has been described herein, however raising and lowering of the restraining member 22 can be achieved by means of a drive assembly in the form of an electric, hydraulic or pneumatic motor mounted either in the casing 20 or in the housing 60. In this regard, as seen in FIG. 9, an electric gear motor 100 can be placed at the bottom of housing 60 to drive an ACME screw 102 through a clutch 104. A screw follower 101 on the screw 102 is connected to the slide 66 to move the slide 66 up or down on the post 62. The same drive system could be placed at the bottom of casing 20 with the screw follower 101 connected directly to the restraining member 22.

The embodiments of the invention in which an exclusive property or privilege is claimed, are defined as follows:

1. A driveway truck restraint assembly adapted to be embedded in the driveway in front of a loading dock in a position to block the path of travel of an ICC bar located on the back of a truck, said assembly comprising a casing adapted to be buried in the driveway, a restraining member mounted in said casing for movement between a storage position within said casing to an operative position projecting upwardly from said casing, and means mounted on said dock for moving said restraining member from the storage position to the blocking position when a truck is located at the rear of the dock, said moving means comprising a cable secured to the lower end of the restraining member, a housing mounted on the loading dock, a post mounted in said housing, a slide mounted on said post and connected to said cable and a handle secured to said slide for manually moving said slide down the post to raise the restraining member to the blocking position.

2. The assembly according to claim 1 including biasing means connecting said cable to said slide for biasing said restraining member toward the blocking position.

3. The assembly according to claim 1 including a plate mounted on said slide for counterbalancing a portion of the weight of the restraining member.

4. The assembly according to claim 2 wherein a portion of said casing projects above the ground and including means mounted on the front of said casing for reinforcing the portion of said casing pojecting above the ground.

5. The assembly according to claim 4 including guide means in the top of said casing for guiding the restraining member in moving up or down in said casing.

6. A driveway truck restraint assembly comprising a casing adapted to be partially buried in a driveway in a spaced relation to a loading dock, a bar mounted in said casing for movement to a position to block the path of travel of the ICC bar located on the back of a truck, a cable secured to the lower end of said bar, a post mounted on said dock, a slide mounted on said post, means for connecting said slide to said cable and means for moving said slide down said post for moving said bar to the blocking position when a truck is located at the rear of the dock.

7. The assembly according to claim 6 wherein said means for moving said slide comprises a handle for manually moving said slide on said post.

8. The assembly according to claim 7 including catch means for latching said handle with said bar in the blocking positions.

9. The assembly according to claim 6 wherein said connecting means comprises a spring for biasing said bar toward the blocking position.

10. The assembly according to claim 6 including a plate mounted on said slide for counterbalancing a portion of the weight of said bar.

11. The assembly according to claim 6 wherein said moving means includes a motor driven drive assembly operatively connected to said slide.

* * * * *